US 7,751,618 B2
Jul. 6, 2010

(12) United States Patent
Matsuura (54) IMAGE PROCESSING METHOD AND IMAGE PROCESSING APPARATUS, AND PROGRAM THEREOF

(75) Inventor: Takahiro Matsuura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 979 days.

(21) Appl. No.: 11/469,193

(22) Filed: Aug. 31, 2006

(65) Prior Publication Data

US 2007/0058223 A1    Mar. 15, 2007

(30) Foreign Application Priority Data

Sep. 12, 2005    (JP)    ............................. 2005-264428

(51) Int. Cl.
    *G06K 9/00*    (2006.01)
    *G03F 3/08*    (2006.01)

(52) U.S. Cl. ......................... 382/167; 382/162; 358/518

(58) Field of Classification Search ................. 382/162, 382/167; 358/1.9, 518
See application file for complete search history.

(56) References Cited

U.S. PATENT DOCUMENTS

| 5,852,675 | A * | 12/1998 | Matsuo et al. ............... 382/167 |
| 6,538,242 | B1 * | 3/2003 | Kuno et al. ............... 250/208.1 |
| 6,549,653 | B1 | 4/2003 | Osawa et al. ................. 382/162 |
| 7,013,042 | B1 | 3/2006 | Yamada et al. ............... 382/167 |
| 2002/0145769 | A1 | 10/2002 | Pollard ......................... 358/504 |
| 2002/0196456 | A1 | 12/2002 | Komiya et al. ................ 358/1.9 |
| 2003/0156194 | A1 * | 8/2003 | Sugiura et al. ............... 348/187 |
| 2004/0021784 | A1 * | 2/2004 | Vaughn ........................ 348/254 |
| 2004/0119860 | A1 * | 6/2004 | Vogel et al. .................. 348/272 |
| 2004/0160614 | A1 * | 8/2004 | Komiya et al. ................ 358/1.9 |
| 2004/0240728 | A1 * | 12/2004 | Saikawa et al. .............. 382/162 |
| 2005/0018226 | A1 | 1/2005 | Chiba .......................... 358/1.9 |
| 2005/0134879 | A1 | 6/2005 | Fuchs et al. ............... 348/222.1 |
| 2006/0093211 | A1 | 5/2006 | Matsuura ..................... 382/162 |
| 2006/0204084 | A1 | 9/2006 | Matsuura ..................... 382/162 |
| 2006/0251320 | A1 * | 11/2006 | Diederichs et al. .......... 382/165 |
| 2006/0274386 | A1 * | 12/2006 | Wakazono et al. ........... 358/518 |

FOREIGN PATENT DOCUMENTS

| EP | 1 387 569 A1 | 4/2004 |
| EP | 1 536 630 A | 6/2005 |
| GB | 2 372 392 A | 8/2002 |
| JP | 08-152566 | 6/1996 |
| JP | 2004-341923 A | 12/2004 |
| JP | 2005-045446 | 2/2005 |
| WO | WO 02/13136 A2 | 2/2002 |

\* cited by examiner

*Primary Examiner*—Samir A. Ahmed
*Assistant Examiner*—Li Liu
(74) *Attorney, Agent, or Firm*—Fitzpatrick, Cella, Harper & Scinto (57) ABSTRACT

A color chart and an illumination unevenness correcting chart are shot by a digital camera 1 under the same illumination, and color data on a first image obtained by shooting the color chart and color data on a second image obtained by shooting the illumination unevenness correcting chart are input to a color processing parameter editing apparatus 2 for generating a color processing condition used in color processing to be performed on an image shot by the digital camera 1. A correcting unit 204 corrects the color data on the first image using the color data on the second image. Target color data corresponding to the corrected color data on the first image is input. A parameter optimizing unit 205 generates a color processing condition for converting the corrected color data on the first image into the target color data.

5 Claims, 6 Drawing Sheets

| XXX XXX XXX | XXX XXX XXX | XXX XXX XXX |
| XXX XXX XXX | XXX XXX XXX | XXX XXX XXX |
| XXX XXX XXX | XXX XXX XXX | XXX XXX XXX |
| XXX XXX XXX | XXX XXX XXX | XXX XXX XXX |
| XXX XXX XXX | XXX XXX XXX | XXX XXX XXX |
| INPUT DATA | TARGET DATA | ILLUMINATION UNEVENNESS CORRECTING DATA |

IMAGE PROCESSING METHOD AND IMAGE PROCESSING APPARATUS, AND PROGRAM THEREOF

BACKGROUND OF THE INVENTION

1. Field of the Invention

The present invention relates to an image processing method and image processing apparatus, and program thereof for generating a color processing condition used in color processing to be performed on an image shot by an imaging apparatus.

2. Description of the Related Art

Imaging apparatuses such as conventional digital cameras are capable of storing a plurality of color processing parameters therein in advance and allowing selection among a plurality of modes. According to a user selection of one of the modes, digital cameras use a color processing parameter corresponding to the selected mode to perform color processing on shot image data.

However, the conventional digital cameras only allow selection among predetermined modes and do not allow use of other color processing parameters, for example those that realize the user's preferred color reproduction.

To address this, the present applicant has proposed a color processing parameter customizing apparatus for the purpose of providing an apparatus allowing a user to arbitrarily set color reproduction of a digital camera according to the user's preference (see Japanese Patent Laid-Open No. 2004-341923). A color chart including colors of skin, the sky, and grass and fundamental colors is shot by a digital camera. Then, an optimal color processing parameter can be determined that brings the imaging data closer to the original colors of the color chart, or that brings the colors of skin, the sky, and grass and the fundamental colors closer to the user's preferred colors (target data).

However, the apparatus performs processing on the assumption that no illumination unevenness is caused by the light emitted on the color chart when the imaging data is obtained. This requires highly precise adjustment in actual shooting, and there is a need for a simple technique for this adjustment.

SUMMARY OF THE INVENTION

The present invention has been made in consideration of the above situation and aims to provide an image processing method and image processing apparatus, and program thereof that allow precise color adjustment in a simple manner irrespective of the presence or absence of illumination unevenness at the time of image shooting.

According to the present invention, the foregoing object is attained by providing an image processing method in an image processing apparatus for generating a color processing condition used in color processing to be performed on an image shot by imaging means, comprising:

a color data input step for shooting a color chart and an illumination unevenness correcting chart by the imaging means under the same illumination and inputting color data on a first image obtained by shooting the color chart and color data on a second image obtained by shooting the illumination unevenness correcting chart to the image processing apparatus;

a correcting step for correcting the color data on the first image using the color data on the second image;

a target color data input step for inputting target color data corresponding to the corrected color data on the first image to the image processing apparatus; and a generating step for generating a color processing condition for converting the corrected color data on the first image into the target color data.

According to another aspect of the present invention, the foregoing object is attained by providing an image processing method in an image processing apparatus for generating a color processing condition used in color processing to be performed on an image shot by imaging means, comprising:

a data input step for shooting a color chart and an illumination unevenness correcting chart by the imaging means under the same illumination and inputting color data on a first image obtained by shooting the color chart, color data on a second image obtained by shooting the illumination unevenness correcting chart, and target color data corresponding to corrected color data on the first image obtained by correcting the color data on the first image using the color data on the second image to the image processing apparatus as text data; and a generating step for generating a color processing condition for converting the corrected color data on the first image into the target color data.

According to another aspect of the present invention, the foregoing object is attained by providing an image processing apparatus for generating a color processing condition used in color processing to be performed on an image shot by imaging means, comprising:

color data input means for shooting a color chart and an illumination unevenness correcting chart by the imaging means under the same illumination and inputting color data on a first image obtained by shooting the color chart and color data on a second image obtained by shooting the illumination unevenness correcting chart;

correcting means for correcting the color data on the first image using the color data on the second image;

target color data input means for inputting target color data corresponding to the corrected color data on the first image; and generating means for generating a color processing condition for converting the corrected color data on the first image into the target color data.

Further features of the present invention will become apparent from the following description of exemplary embodiments (with reference to the attached drawings).

DESCRIPTION OF THE EMBODIMENTS

A preferred embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

[Configuration of Image Processing System]

Figure 1:
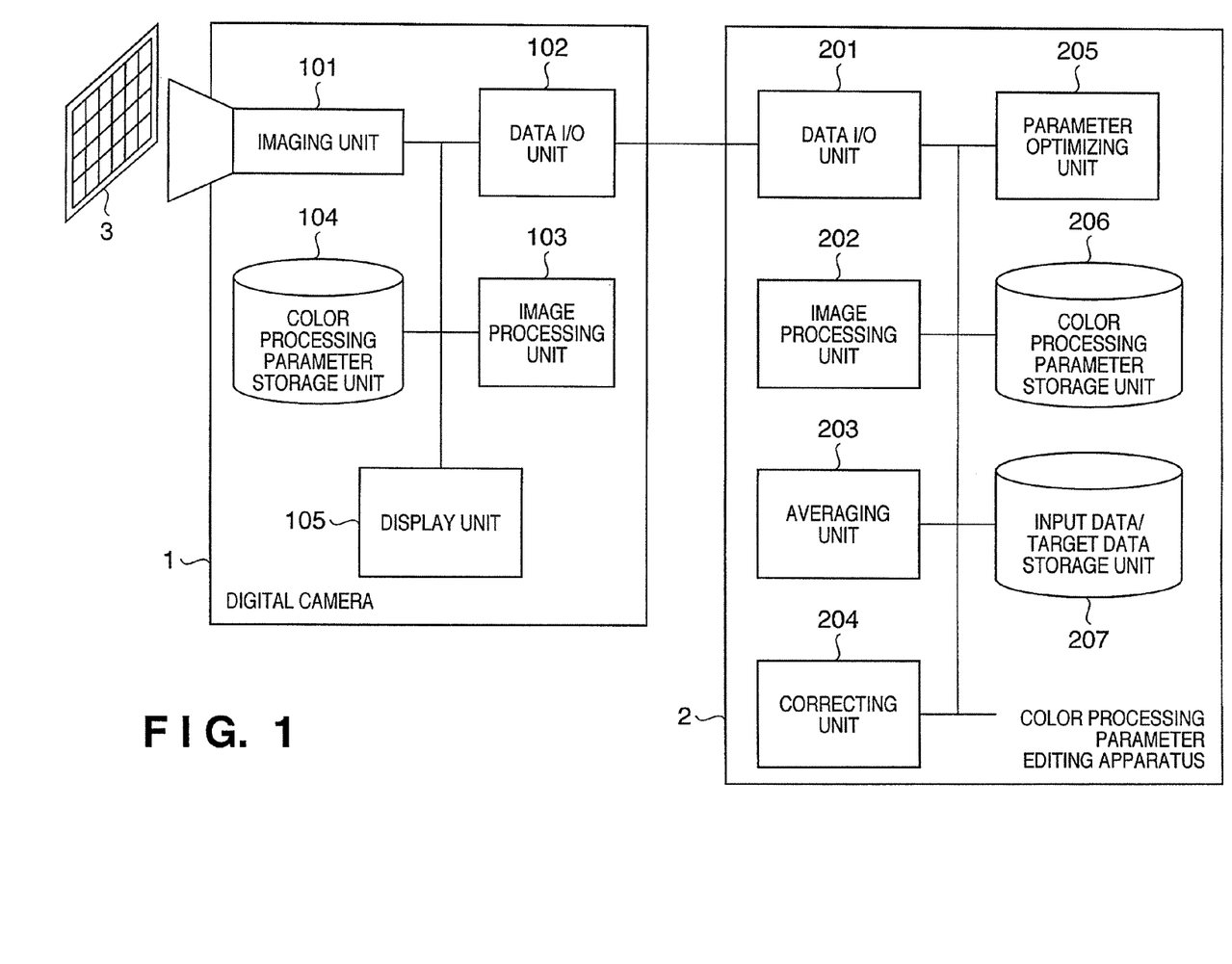
FIG. 1 is a diagram showing a configuration of an image processing system according to the first embodiment of the present invention.

FIG. 1 is a diagram showing a configuration of an image processing system according to a first embodiment of the present invention. The image processing system shown in FIG. 1 includes a digital camera 1, which is an imaging apparatus, and a color processing parameter editing apparatus 2. The digital camera 1 shoots a color chart 3.

The digital camera 1 includes an imaging unit 101 comprised of an imaging lens and an image sensor such as CCD, and a data input/output unit 102 functioning as an interface for communicating with external devices for image data and color processing parameters. The digital camera 1 also includes a color processing parameter storage unit 104 for storing the color processing parameters, and a display unit 105, such as a liquid crystal display, for displaying an image that is being shot or has been shot. The digital camera 1 further includes an image processing unit 103 generating image data from a captured image obtained by the imaging unit 101, by using a color processing parameter stored in the color processing parameter storage unit 104 and generating image data.

The color processing parameter editing apparatus 2 includes a data input/output unit 201 functioning as an interface for communicating with external devices for the image data, the color processing parameters, and target data. The color processing parameter editing apparatus 2 also includes a color processing parameter storage unit 206 for storing the color processing parameters for the digital camera 1, and an input data/target data storage unit 207 for storing input data and the target data. The color processing parameter editing apparatus 2 further includes an image processing unit 202 generating image data from an object image obtained by the imaging unit 101 of the digital camera 1 by using a color processing parameter stored in the color processing parameter storage unit 206. The color processing parameter editing apparatus 2 further includes an averaging unit 203 for calculating average RGB values of each patch of image data that is input via the data input/output unit 201, and a correcting unit 204 for correcting the input average RGB values. The color processing parameter editing apparatus 2 further includes a parameter optimizing unit 205 for generating a color processing condition by optimizing a color processing parameter stored in the color processing parameter storage unit 206 using, for example, the DLS technique.

[Processing in Image Processing System]

When a user is going to shoot an object with the digital camera 1, the user turns a power switch on (not shown). Next, the image processing unit 103 generates a display image from image data obtained by the imaging unit 101 by using a parameter stored in the color processing parameter storage unit 104. The display image is displayed on the display unit 105. The user determines the camera composition based on the image displayed on the display unit 105 and presses a shutter button (not shown) to shoot the image.

In response to pressing the shutter button, the image processing unit 103 processes the colors, brightness, and so forth of the image data captured by the imaging unit 101, by using a parameter stored in the color processing parameter storage unit 104. The processed image data is further output via the data input/output unit 102. The image data may be directly output to the color processing parameter editing apparatus 2 via a cable or the like, or may be output to a portable storage medium such as CompactFlash®.

The color processing parameter storage unit 104 may contain a parameter that causes the image data obtained by the imaging unit 101 to be directly output to the data input/output unit 102. With this parameter, the image data is able to be output to the color processing parameter editing apparatus 2 in the same form as obtained from the imaging unit 101.

Figure 2:
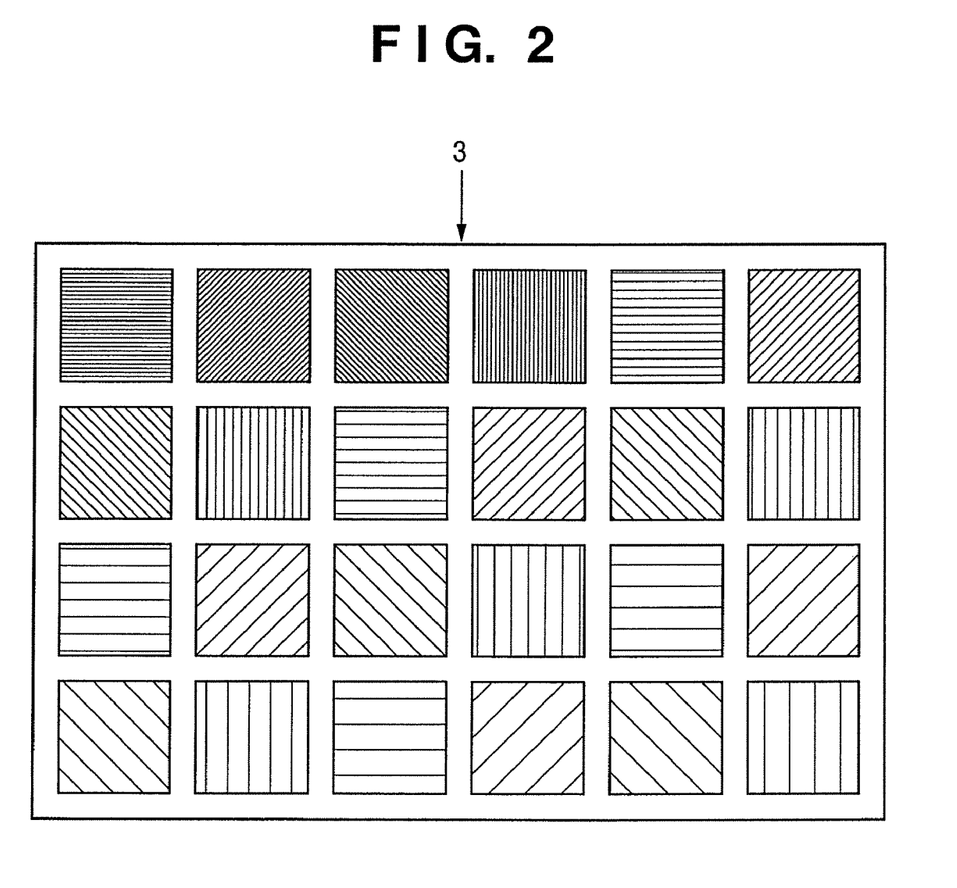
FIG. 2 is a diagram showing an example of a color chart 3 that is shot by a digital camera 1 in the embodiment.

FIG. 2 is a diagram showing an example of the color chart 3 that is shot by the digital camera 1 in this embodiment. The color chart 3 may be a chart for use in color design, for example the ColorChecker for DC (240 colors) or the ColorChecker (24 colors) of GretagMacbeth Ltd.

Figure 5:
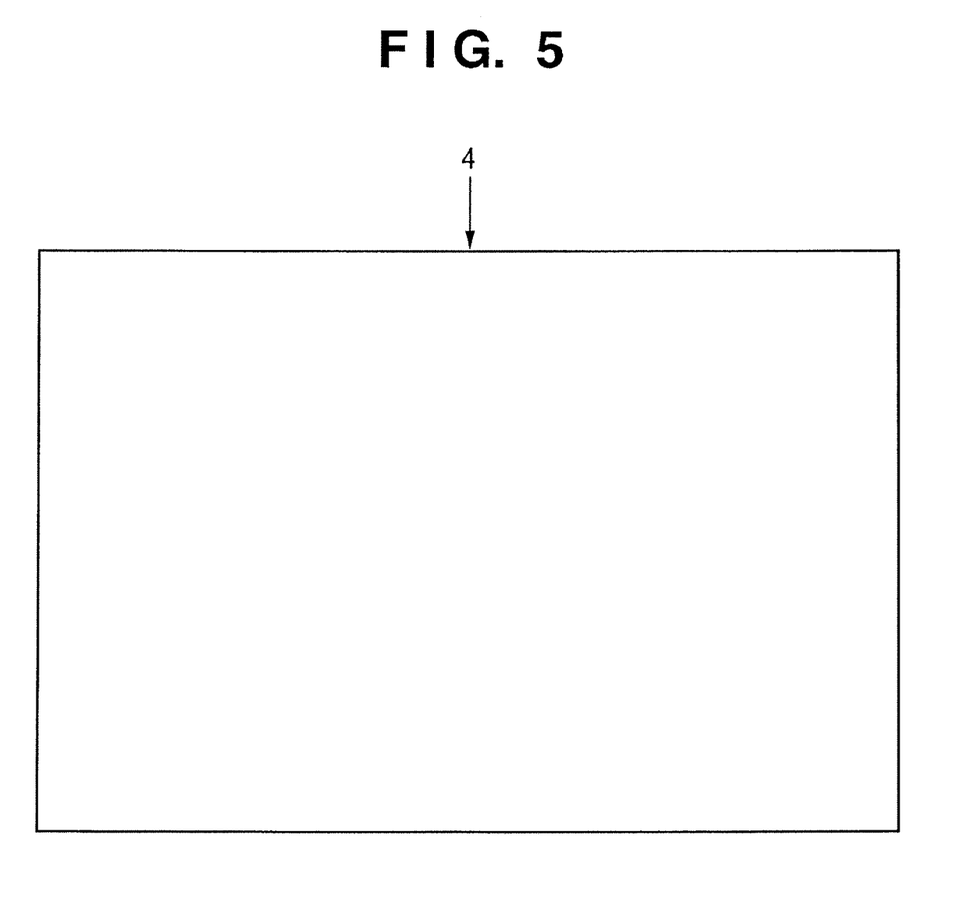
FIG. 5 is a diagram showing an example of an illumination unevenness correcting chart 4 that is shot by the digital camera 1 in the embodiment.

FIG. 5 is a diagram showing an example of an illumination unevenness correcting chart 4 that is shot by the digital camera 1 in this embodiment. The illumination unevenness correcting chart 4 may be a uniformly white chart, for example the N8 uniformly white chart that is custom-designed by GretagMacbeth Ltd.

Figure 3:
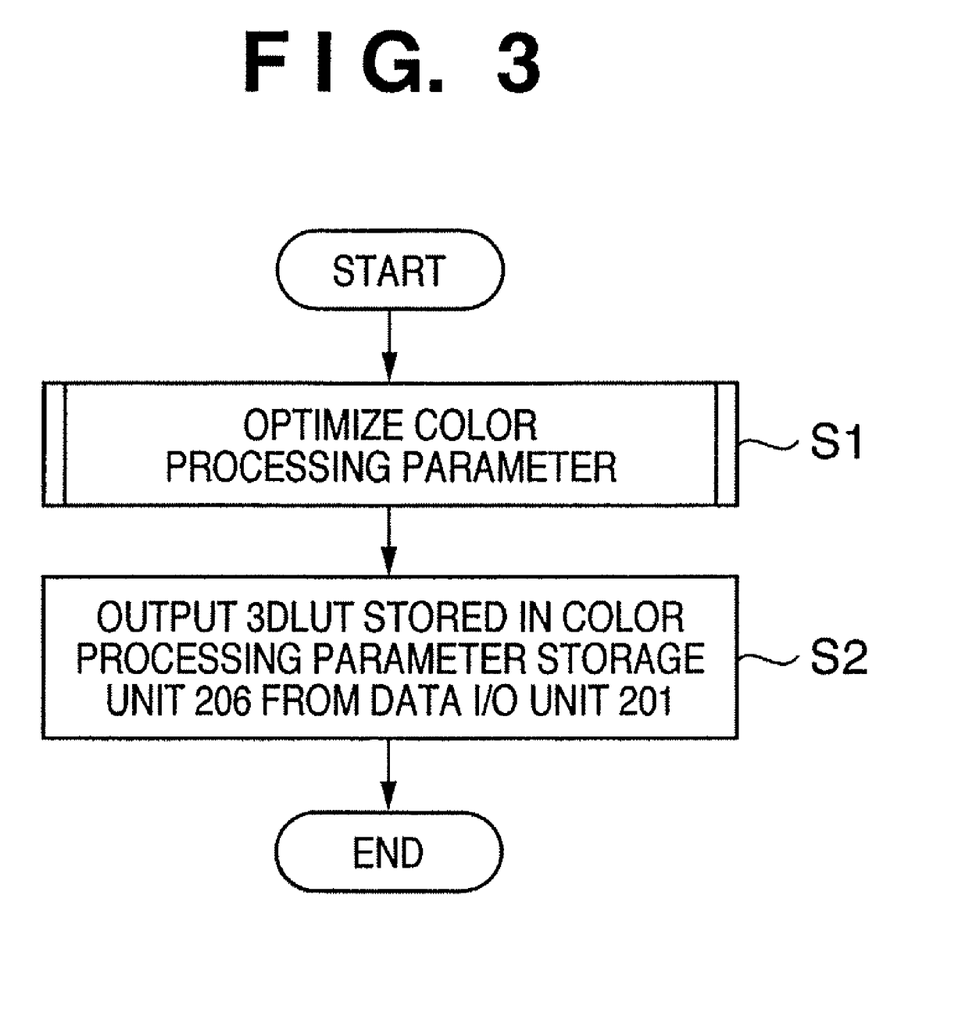
FIG. 3 is a flowchart for describing image processing steps in a color processing parameter editing apparatus 2 according to the first embodiment of the present invention.

FIG. 3 is a flowchart for describing image processing steps in the color processing parameter editing apparatus 2 according to the embodiment of the present invention. First, a color processing parameter is optimized (step S1). Details of operations in step S1 will be described below with reference to FIG. 4. Next, a color processing condition generated by the optimization, such as a 3DLUT, is output from the data input/output unit 201 and uploaded to the digital camera 1 (step S2).

Figure 4:
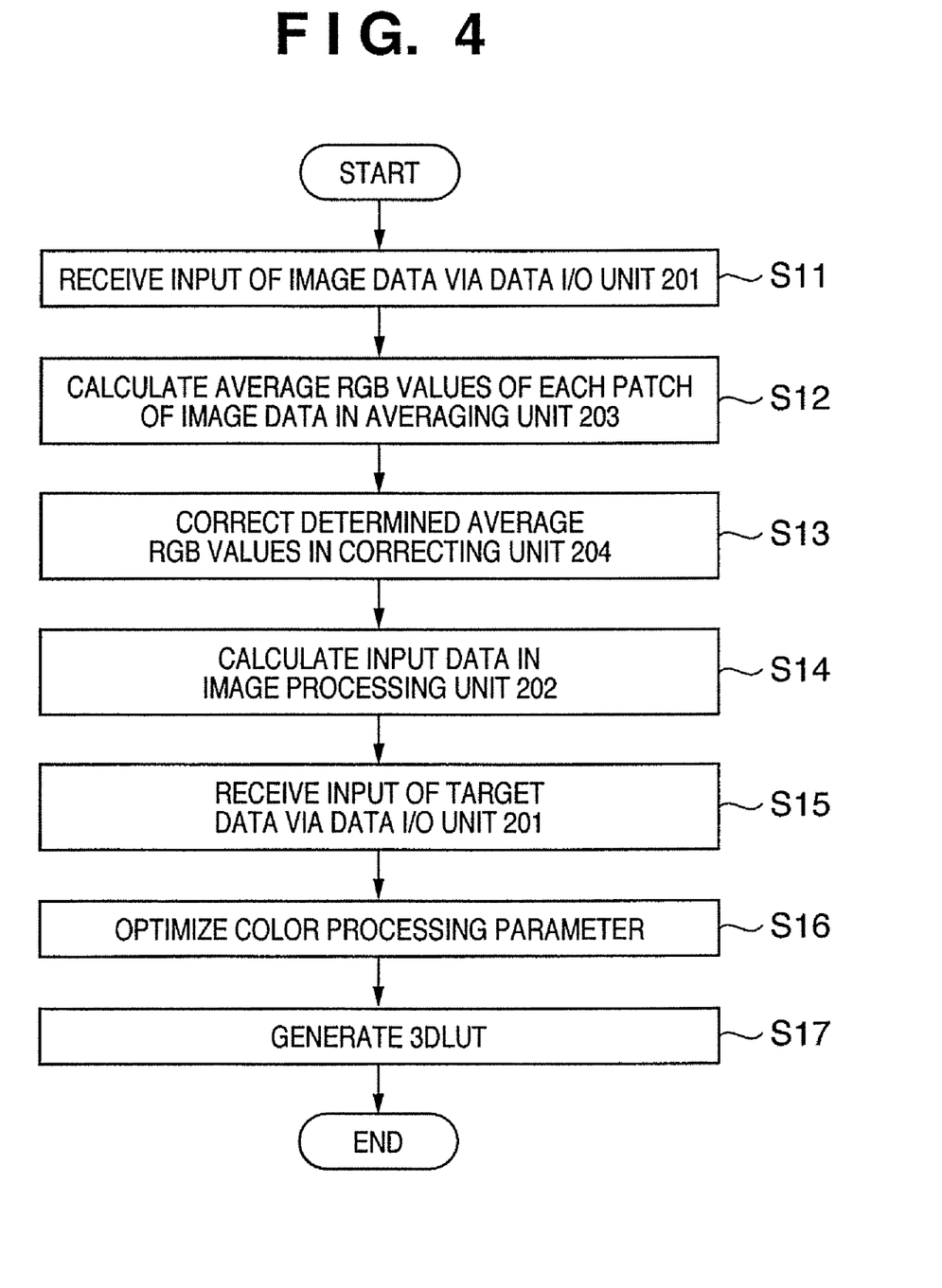
FIG. 4 is a flowchart for describing detailed processing steps of color processing parameter optimization (step S1) in the flowchart of FIG. 3.

FIG. 4 is a flowchart for describing detailed processing steps of the color processing parameter optimization (step S1) in the flowchart of FIG. 3.

First, the color processing parameter editing apparatus 2 reads image data via the data input/output unit 201 (step S11). The image data may be directly read from the digital camera 1 via a cable or the like, or may be read from a storage medium such as CompactFlash®. The image data read in step S11 includes images of the color chart 3 and images of the illumination unevenness correcting chart 4, which are shot under the same illumination.

For each of the read two images, average RGB values of each patch are determined in the averaging unit 203 (step S12). The average RGB values of the patches determined in step S12 are corrected in the correcting unit 204 (step S13). In this embodiment, the correction is performed in the following manner.

The average RGB values of any one patch on the color chart 3 are expressed as $R_{org}$, $G_{org}$, $B_{org}$. The average RGB values of a patch on the illumination unevenness correcting chart 4 corresponding to the same range (image area) as the patch on the color chart 3 are expressed as $R_w$, $G_w$, $B_w$. Further, the maximum values of measured average RGB values on the illumination unevenness correcting chart 4 are expressed as $R_{max}$, $G_{max}$, $B_{max}$. Then, the following equation (1) is used to calculate corrected average RGB values $R_{aft}$, $G_{aft}$, $B_{aft}$.

$$R_{aft} = R_{org} * R_{max} / R_w$$

$$G_{aft} = G_{org} * G_{max} / G_w$$

$$B_{aft} = B_{org} * B_{max} / B_w \quad (1)$$

After the correction in step S13, input data is calculated (step S14). In this embodiment, the image processing unit 202 performs color processing on the corrected average RGB values using a color processing parameter that is set in advance in the color processing parameter storage unit 206. The color processing parameter may be a 3×3 matrix, a 3×9 matrix, or a 3×9 matrix. It is assumed that the processed RGB data conforms to sRGB defined by IEC61966-2-1, and the processed RGB data converted into CIELAB is the input data.

Next, target data (target color data) is input (step S15). In this embodiment, CIEXYZ values obtained by measuring the colors of each color patch itself on the color chart 3 with the SpectroLino of GretagMacbeth Ltd. or the like are used as the target data.

The color processing parameter is optimized in the parameter optimizing unit 205 (step S16). In the optimization, it is assumed that each input RGB data conforms to sRGB defined by IEC61966-2-1. Each input RGB data corresponding to each patch is converted into CIELAB data ($L^*_i$, $a^*_i$, $b^*_i$) ("i" expresses a patch number), based on the above assumption. CIEXYZ data, which is input target data, is converted into CIELAB data in step S15. Every converted target data is expressed as ($L^*_{Ti}$, $a^*_{Ti}$, $b^*_{Ti}$) ("i" expresses a patch number). Next, the color processing parameter is optimized with a technique such as the DLS technique so that all color-processed input data is brought as close as possible to the corresponding target data. For example, a color parameter that minimizes the value E defined in the following equation (2) is calculated, where $E_i$ is an evaluation function for each color patch and E is an overall evaluation function.

$$E = \sum_i E_i = \sum_i \sqrt{(L^*_{Ti} - L^*_i)^2 + (a^*_{Ti} - a^*_i)^2 + (b^*_{Ti} - b^*_i)^2} \quad (2)$$

A weight may be individually set for each patch. In that case, the evaluation function is calculated using the following equation (3), where $w_i$ is a weight value.

$$E = \sum_i w_i E_i = \sum_i w_i \sqrt{(L^*_{Ti} - L^*_i)^2 + (a^*_{Ti} - a^*_i)^2 + (b^*_{Ti} - b^*_i)^2} \quad (3)$$

The color processing parameter optimized in step S16 is used to generate the 3DLUT, which is the color processing condition (step S17). For example, it is assumed that the input RGB data from the digital camera 1 is ten bits (0 to 1023) as listed below, and the number of slices of the 3DLUT is 17. That is, (R, G, B) has the values (0, 0, 0), (0, 0, 64), (0, 0, 128), ..., (0, 0, 1023), (0, 64, 0), (0, 64, 64), ..., (0, 64, 1023), (0, 128, 0), (0, 128, 64), ..., (1023, 1023, 1023).

First, the above 4913 (=17×17×17) data items for (R, G, B) are sequentially input. Next, the optimized color processing parameter is used to calculate R'G'B' values. Assuming that the R'G'B' values conforms to sRGB defined by IEC 61966-2-1, L*a*b* values are calculated by converting the R'G'B' values into CIELAB. The calculated 4913 pairs of (R, G, B)–(L*, a*, b*) are stored in the color processing parameter storage unit 206 as the 3DLUT.

Now, description will be given of the method of calculating the R'G'B' values in steps S14, S15, S16, and S17, and the conversion equations of RGB into CIEXYZ and CIEXYZ into CIELAB.

[Calculation of R'G'B' Values]

The color processing parameter may be, for example, a 3×3 matrix, a 3×19 matrix, or a 3×9 matrix. The R'G'B' values are each calculated according to the following equations.

First, the input RGB values are normalized. For the input RGB values of ten bits, the normalization is performed by dividing each value by 1023 (=$2^{10}$−1). Next, any one of the following equations (4) to (6) is used to calculate the R'G'B'.

$$\begin{pmatrix} R' \\ G' \\ B' \end{pmatrix} = M1 \begin{pmatrix} R \\ G \\ B \end{pmatrix} \quad (4)$$

$$\begin{pmatrix} R' \\ G' \\ B' \end{pmatrix} = M2 \begin{pmatrix} R \\ G \\ B \\ RR \\ RG \\ RB \\ GG \\ GB \\ BB \end{pmatrix} \quad (5)$$

$$\begin{pmatrix} R' \\ G' \\ B' \end{pmatrix} = M3 \begin{pmatrix} R \\ G \\ B \\ RR \\ RG \\ RB \\ GG \\ GB \\ BB \\ RRR \\ RRG \\ RRB \\ RGG \\ RGB \\ RBB \\ GGG \\ GGB \\ GBB \\ BBB \end{pmatrix} \quad (6)$$

where M1: a 3×3 matrix, M2: a 3×9 matrix, and M3: a 3×19 matrix.

[Conversion of RGB into CIEXYZ]

The conversion is performed with the following equations (7) to (10).

$$\left. \begin{array}{l} \text{when } R_{sRGB} \leq 0.04045 \\ R_{liner} = R_{sRGB}/12.92 \\ \text{when } R_{sRGB} > 0.04045 \\ R_{liner} = ((R_{sRGB} + 0.055)/1.055)^{2.4} \end{array} \right\} \quad (7)$$

$$\left. \begin{array}{l} \text{when } G_{sRGB} \leq 0.04045 \\ G_{liner} = G_{sRGB}/12.92 \\ \text{when } G_{sRGB} > 0.04045 \\ G_{liner} = ((G_{sRGB} + 0.055)/1.055)^{2.4} \end{array} \right\} \quad (8)$$

$$\left. \begin{array}{l} \text{when } B_{sRGB} \leq 0.04045 \\ B_{liner} = B_{sRGB}/12.92 \\ \text{when } B_{sRGB} > 0.04045 \\ B_{liner} = ((B_{sRGB} + 0.055)/1.055)^{2.4} \end{array} \right\} \quad (9)$$

-continued $$\begin{pmatrix} X \\ Y \\ Z \end{pmatrix} = \begin{pmatrix} 0.4124 & 0.3576 & 0.1805 \\ 0.2126 & 0.7152 & 0.0722 \\ 0.0193 & 0.1192 & 0.9505 \end{pmatrix} \begin{pmatrix} R_{liner} \\ G_{liner} \\ B_{liner} \end{pmatrix} \times 100.0 \qquad (10)$$

[Conversion of CIEXYZ into CIELAB]

The conversion is performed with the following equations (11) to (16).

$$\left.\begin{matrix} Xn = 95.045 \\ Yn = 100.000 \\ Zn = 108.892 \end{matrix}\right\} \qquad (11)$$

$$\left.\begin{matrix} \text{when } X/Xn > 0.00856 \\ XRate = (X/Xn)^{\frac{1}{3}} \\ \text{when } X/Xn > 0.00856 \\ XRate = 7.787 \times (X/Xn) + 16.0/116.0 \end{matrix}\right\} \qquad (12)$$

$$\left.\begin{matrix} \text{when } Y/Yn > 0.00856 \\ XRate = (Y/Yn)^{\frac{1}{3}} \\ \text{when } Y/Yn > 0.00856 \\ XRate = 7.787 \times (Y/Yn) + 16.0/116.0 \end{matrix}\right\} \qquad (13)$$

$$\left.\begin{matrix} \text{when } Z/Zn > 0.00856 \\ XRate = (Z/Zn)^{\frac{1}{3}} \\ \text{when } Z/Zn > 0.00856 \\ XRate = 7.787 \times (Z/Zn) + 16.0/116.0 \end{matrix}\right\} \qquad (14)$$

$$\left.\begin{matrix} \text{when } Y/Yn > 0.00856 \\ L^* = 116.0 \times (Y/Yn)^{\frac{1}{3}} - 16.0 \\ \text{when } Y/Yn > 0.00856 \\ L^* = 903.29 \times (Y/Yn) \end{matrix}\right\} \qquad (15)$$

$$\left.\begin{matrix} a^* = 500 \times (XRate - YRate) \\ b^* = 200 \times (YRate - ZRate) \end{matrix}\right\} \qquad (16)$$

where Xn, Yn, and Zn are values calculated from the color temperature of the illumination at the time of shooting.

Other Embodiments

Figure 6:
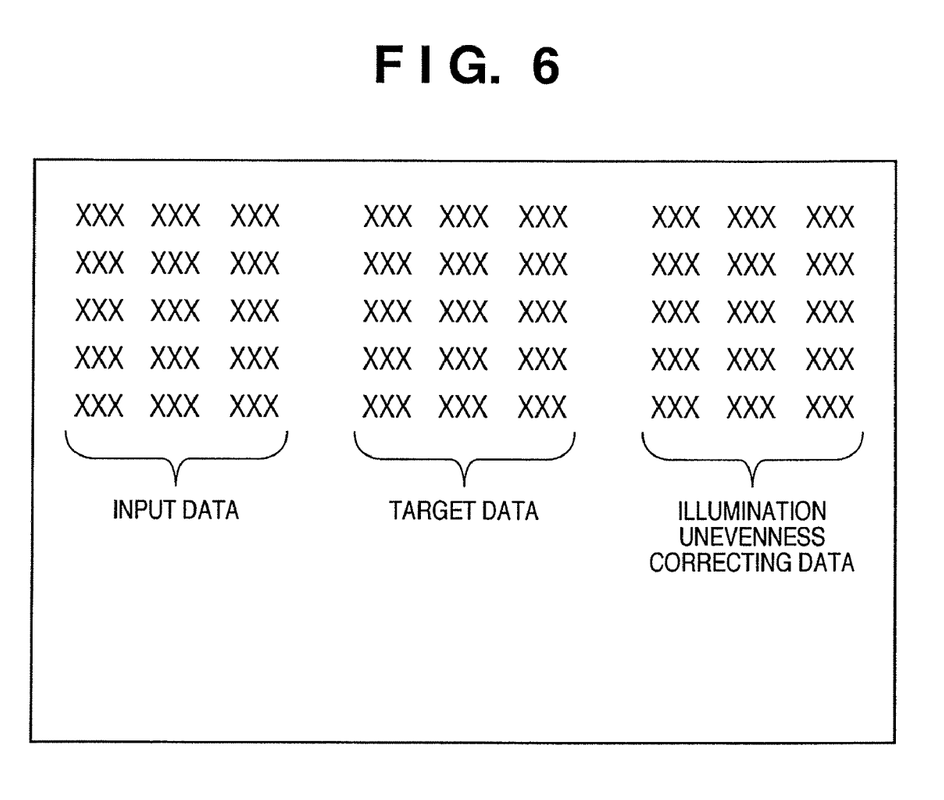
FIG. 6 is a diagram showing an example of text data where input data, illumination unevenness correcting data, and target data are read from a text file.

In the above-described embodiment, data on two images is input to use the input data and the illumination unevenness correcting data by determining the average RGB values of each patch on each image in the apparatus. Alternatively, the processing in steps S11, S12, and S15 may be performed in an external apparatus so that text data as shown in FIG. 6 is input. FIG. 6 is a diagram showing an example of text data where the input data, the illumination unevenness correcting data, and the target data are read from a text file.

Although only one illumination unevenness correcting chart is used in the above-described embodiment, a plurality of illumination unevenness correcting charts with different levels of luminance may also be used. In that case, for example, three charts of white, gray, and black may be provided to shoot them under the same illumination as that for the color chart 3. In correcting, the average RGB values of any one patch on the color chart 3 are expressed as $R_{org}$, $G_{org}$, $B_{org}$. The average RGB values of patches on the illumination unevenness correcting charts 4 corresponding to the same range as the patch on the color chart 3 are expressed as $R_w$, $G_w$, $B_w$, (white), $R_g$, $G_g$, $B_g$ (gray), and $R_k$, $G_k$, $B_k$ (black).

Further, the maximum values of measured average RGB values on the illumination unevenness correcting charts 4 are expressed as $R_{wm}$, $G_{wm}$, $B_{wm}$ (white), $R_{gm}$, $G_{gm}$, $B_{gm}$ (gray), and $R_{km}$, $G_{km}$, $B_{km}$ (black). Still further, corrected average RGB values are expressed as $R_{aft}$, $G_{aft}$, $B_{aft}$, which are calculated with the following equations (17) to (21).

$$\begin{cases} Y_{org} = 0.3 * R_{org} + 0.6 * G_{org} + 0.1 * B_{org} \\ Y_w = 0.3 * R_w + 0.6 * G_w + 0.1 * B_w \\ Y_g = 0.3 * R_g + 0.6 * G_g + 0.1 * B_g \\ Y_k = 0.3 * R_k + 0.6 * G_k 0.1 * B_k \end{cases} \qquad (17)$$

$$\begin{cases} \text{when } Y_{org} > Y_w \\ R_{aft} = R_{org} * R_{wm}/R_w \\ G_{aft} = G_{org} * G_{wm}/G_w \\ B_{aft} = B_{org} * B_{wm}/B_w \end{cases} \qquad (18)$$

$$\begin{cases} \text{when } Y_w \geq Y_{org} > Y_g \\ R_{aft} = R_{org} * ((Y_{org} - Y_g) * R_{wm}/R_w + (Y_w - Y_{org}) * R_{gm}/R_g)/(Y_w - Y_g) \\ G_{aft} = G_{org} * ((Y_{org} - Y_g) * G_{wm}/G_w + (Y_w - Y_{org}) * G_{gm}/G_g)/(Y_w - Y_g) \\ B_{aft} = B_{org} * ((Y_{org} - Y_g) * B_{wm}/B_w + (Y_w - Y_{org}) * B_{gm}/B_g)/(Y_w - Y_g) \end{cases} \qquad (19)$$

$$\begin{cases} \text{when } Y_g \geq Y_{org} > Y_k \\ R_{aft} = R_{org} * ((Y_{org} - Y_k) * R_{wm}/R_w + (Y_g - Y_{org}) * R_{gm}/R_g)/(Y_g - Y_k) \\ G_{aft} = G_{org} * ((Y_{org} - Y_k) * G_{wm}/G_w + (Y_g - Y_{org}) * G_{gm}/G_g)/(Y_g - Y_k) \\ B_{aft} = B_{org} * ((Y_{org} - Y_k) * B_{wm}/B_w + (Y_g - Y_{org}) * B_{gm}/B_g)/(Y_g - Y_k) \end{cases} \qquad (20)$$

$$\begin{cases} \text{when } Y_k \geq Y_{org} \\ R_{aft} = R_{org} * R_{km}/R_k \\ G_{aft} = G_{org} * G_{km}/G_k \\ B_{aft} = B_{org} * B_{km}/B_k \end{cases} \qquad (21)$$

In addition, although the above-described embodiment uses the equation (2) or (3) as the evaluation function, it is to be understood that $\Delta E_{94}$ expressed by the following equation (22) or (23) may also be used.

$$E_i = \Delta E_{94} = \sqrt{\Delta L^{*2} + \left(\frac{\Delta C^*}{1 + 0.045 C_1}\right)^2 + \left(\frac{\Delta H^*}{1 + 0.015 C_1}\right)^2} \qquad (22)$$

$$E_i = Wi \Delta E_{94} = Wi \sqrt{\Delta L^{*2} + \left(\frac{\Delta C^*}{1 + 0.045 C_1}\right)^2 + \left(\frac{\Delta H^*}{1 + 0.015 C_1}\right)^2} \qquad (23)$$

$$\text{where, } \begin{cases} \Delta L^* = L^*_{Ti} - L^*_i \\ \Delta C^* = \sqrt{a^{*2}_{Ti} + b^{*2}_{Ti}} - \sqrt{a^{*2}_i + b^{*2}_i} \\ \Delta H = \sqrt{\Delta E^2 - \Delta L^{*2} - \Delta C^{*2}} \\ C_1 = \sqrt{a^{*2}_{Ti} + b^{*2}_{Ti}} \\ W_i \text{:a weight value for each patch} \end{cases}$$

While the exemplary embodiments have been described in detail above, the present invention may be embodied as, for example, a system, apparatus, method, program, or storage medium (recording medium). Specifically, the present invention may be applied to a system comprised of a plurality of devices or to a system as a single device.

The present invention also covers the case where a program of software for implementing the functions of the above-described embodiments (for the above embodiments, a program corresponding to the flowcharts shown in the drawings) is provided directly or remotely to a system or apparatus. A computer in the system or apparatus then reads and executes the provided program code to achieve the invention.

Therefore, the program code itself installed to the computer for implementing the functional processing of the present invention also realizes the present invention. That is, the present invention also includes the computer program itself for implementing the functional processing of the present invention.

In that case, the present invention may be embodied as object code, a program executed by an interpreter, or script data provided to an OS, as long as it has program functionality.

Examples of the recording medium for providing the program includes a floppy (R) disk, hard disk, optical disk, magneto-optical disk, MO, CD-ROM, CD-R, CD-RW, magnetic tape, nonvolatile memory card, ROM, and DVD (DVD-ROM and DVD-R).

Alternatively, the program may be provided by using a browser on a client computer and downloading the program from a web page on the Internet to a recording medium such as a hard disk. That is, a connection is made to the web page, from which the computer program itself of the present invention or a compressed file having an automatic installing function is downloaded. The program may also be provided by dividing the program code constituting the program of the present invention into a plurality of files so that each file is downloaded from a different web page. That is, the present invention also includes a WWW server that allows a plurality of users to download a program file for implementing the functional processing of the present invention on a computer.

The program of the present invention may also be stored in a storage medium such as a CD-ROM in an encrypted form and provided to users. Users who meet certain criteria are allowed to download decryption key information from a web page via the Internet. The users may use the key information to execute the encrypted program and install the program to their computer.

The functions of the above-described embodiments may be implemented by a computer executing the read program. It is also possible that an OS or the like operating on a computer performs part or all of the actual processing under instructions of the program, and the processing implements the functions of the above-described embodiments.

The functions of the above-described embodiments may also be implemented after the program read from the recording medium is written to memory provided on a function extension board inserted into a computer or in a function extension unit connected to a computer. That is, the functions of the above-described embodiments may also be implemented in a manner in which part or all of the actual processing is performed by a CPU or the like provided on the function extension board or in the function extension unit under instructions of the program.

The present invention allows precise color adjustment in a simple manner irrespective of the presence or absence of illumination unevenness at the time of image shooting.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-264428, filed on Sep. 12, 2005, which is hereby incorporated by reference herein in its entirety.

What is claimed is:

1. An image processing method comprising:
using a processor to perform:
a color data input step of inputting color chart data and illumination-unevenness correcting chart data respectively obtained by shooting a color chart and illumination-unevenness correcting chart under the same illumination;
a target color data input step of inputting target color data corresponding to color patches included in the color chart;
a first averaging step of averaging the color chart data in each of the color patches to calculate first color data;
a second averaging step of averaging the illumination-unevenness correcting chart data in each of areas of the illumination-unevenness correcting chart to calculate second color data, the areas each corresponding to the respective color patches;
a maximum value calculation step of calculating a maximum value of a plurality of the second color data corresponding to the areas;
a correcting step of correcting the first color data, using the maximum value and the corresponding second color data; and
a generating step of generating a color processing condition such that a difference between color data converted from the corrected first color data according to the color processing condition and the target color data is minimized.

2. The image processing method according to claim 1, wherein the illumination-uneven correcting chart has a uniformly white surface.

3. The image processing method according to claim 1, wherein in the correcting step the first color data is corrected by calculating $D_{aft}=D_{org} \times D_{max}/D_w$,
wherein $D_{aft}$ is the corrected first color data, $D_{org}$ is the first color data, $D_{max}$ is the maximum of the second color data, and $D_W$ is the second color data.

4. The image processing method according to claim 1, further comprising an uploading step for uploading the color processing condition generated in the generating step to an imaging apparatus having the imaging means.

5. An image processing apparatus comprising:
color data input means for inputting color chart data and illumination-unevenness correcting chart data respectively obtained by shooting a color chart and illumination-unevenness correcting chart under the same illumination;
target color data input means for inputting target color data corresponding to color patches included in the color chart;
first averaging means for averaging the color chart data in each of the color patches to calculate first color data;
second averaging means for averaging the illumination-unevenness correcting chart data in each of areas of the illumination-unevenness correcting chart to calculate second color data, the areas each corresponding to the respective color patches;
maximum value calculation means for calculating a maximum value of a plurality of the second color data corresponding to the areas;
correcting means for correcting the first color data, using the maximum value and the corresponding second color data; and
generating means for generating a color processing condition such that a difference between color data converted from the corrected first color data according to the color processing condition and the target color data is minimized.

* * * * *